United States Patent
Hawkes et al.

(10) Patent No.: US 8,606,947 B2
(45) Date of Patent: Dec. 10, 2013

(54) HEURISTICS PROCESSING

(75) Inventors: Jon Hawkes, Winchester (GB); Simon J. Maple, Basingstoke (GB); Daniel J. Matthews, Southampton (GB); Ian Robinson, Southampton (GB); Andrew Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 12/472,683

(22) Filed: May 27, 2009

(65) Prior Publication Data

US 2009/0300212 A1 Dec. 3, 2009

(30) Foreign Application Priority Data

May 27, 2008 (EP) ..................................... 08157005

(51) Int. Cl.
*G06F 15/16* (2006.01)

(52) U.S. Cl.
USPC ........... 709/230; 709/237; 709/201; 709/248; 707/612; 707/613; 707/615

(58) Field of Classification Search
USPC ................. 709/237, 201, 203, 205, 230, 248; 707/609, 612, 613, 615
See application file for complete search history.

(56) References Cited

U.S. PATENT DOCUMENTS

| | | | | |
|---|---|---|---|---|
| 5,095,421 A * | 3/1992 | Freund | ........................... | 718/101 |
| 5,261,089 A * | 11/1993 | Coleman et al. | ...................... | 1/1 |
| 5,335,343 A * | 8/1994 | Lampson et al. | ................ | 714/19 |
| 5,872,969 A * | 2/1999 | Copeland et al. | ............. | 718/101 |
| 6,856,993 B1 * | 2/2005 | Verma et al. | ........................... | 1/1 |
| 7,673,307 B2 * | 3/2010 | Matthews et al. | ............. | 719/314 |
| 2002/0004820 A1 * | 1/2002 | Baldwin et al. | ............... | 709/206 |
| 2002/0087366 A1 * | 7/2002 | Collier et al. | ..................... | 705/5 |
| 2003/0046298 A1 * | 3/2003 | Weedon | ........................ | 707/102 |
| 2004/0240444 A1 * | 12/2004 | Matthews et al. | ............. | 370/389 |
| 2006/0075277 A1 * | 4/2006 | Johnson et al. | .................... | 714/4 |
| 2006/0080117 A1 * | 4/2006 | Carr et al. | ......................... | 705/1 |
| 2006/0095438 A1 * | 5/2006 | Fachan et al. | ................... | 707/10 |
| 2006/0123128 A1 * | 6/2006 | Feingold et al. | .............. | 709/230 |
| 2006/0174224 A1 * | 8/2006 | Parkinson et al. | ............. | 717/120 |
| 2008/0168469 A1 * | 7/2008 | Feingold et al. | .............. | 719/313 |

OTHER PUBLICATIONS

OASIS Standard;Web Services Atomic Transaction (WS-AtomicTransaction) Version 1.1; Apr. 16, 2007; http://docs.oasis-open.org/ws-tx/wstx-wsat-1.1 -spec-os/wstx-wsat-1.1-spec-os.html.*

* cited by examiner

*Primary Examiner* — Abdullahi Salad
*Assistant Examiner* — Jimmy H Tran
(74) *Attorney, Agent, or Firm* — Lee Law, PLLC; Christopher B. Lee (57) ABSTRACT

The invention provides a mechanism for a transaction coordinator to indicate to a transaction participant that it supports a heuristic outcome, where a course of action has occurred which means that the transaction participant is unable to honor a transactional prior commitment to the transaction coordinator. The mechanism is such that a transaction participant that is incapable of communicating a heuristic outcome may ignore any such indication. A transaction participant may be incapable because it does not understand the concept of a heuristic outcome at all or because it does not have the ability to inform the transaction coordinator that a heuristic outcome has occurred.

19 Claims, 4 Drawing Sheets

HEURISTICS PROCESSING

RELATED APPLICATIONS

This application claims priority to and claims the benefit of European Patent Application Serial No. EP08157005.3 titled "HEURISTIC PROCESSING," which was filed in the European Patent Office on May 27, 2008, and which is incorporated herein by reference in its entirety.

BACKGROUND

The present invention relates to transaction support and more particularly to heuristic transactional support.

The WS-AtomicTransaction (WS-AT) specification, standardized by OASIS®, describes web services protocol messages for distributed two phase commit (2PC). It is inspired by the distributed transaction processing (XA) and object transaction service (OTS) specifications each of which render 2PC messages for specific scenarios. Both XA and OTS define messages and state transitions for "heuristic" outcomes; that is, when the transaction participant is unable to honor the commitment it made in the first (prepare) phase of 2PC. WS-AT does not do this because one of the author companies declared it "out of scope" for the interoperability scenarios their products would support.

SUMMARY

Nevertheless, there are others who desire the provision of heuristic support. Any solution catering for heuristics however, would extend the WS-AT specification and would not be understood by a true WS-AT implementer. Consequently a WS-AT provider that implements any heuristic support should do so in a way that is sympathetic to the capability of its transactional partner.

Previously a participant may have been able to receive information that a heuristic outcome has occurred, but may not have been able to communicate such information to a transaction coordinator because the participant may not be certain that the coordinator supported a heuristic outcome. Further in the WS-AT protocol there was no message for communicating the information defined.

According to a first aspect, there is provided a method, comprising: receiving, at a transaction participant, a message from a transaction coordinator comprising an indication as to whether the transaction coordinator supports a heuristic response; determining from a message element in the message whether the transaction coordinator supports heuristics, where the message element is ignorable by transaction participants that are incapable of communicating the heuristic response to the transaction coordinator; and responsive to determining that a heuristic outcome has occurred and determining that the transaction coordinator supports heuristics, sending the heuristic response to the transaction coordinator, where the heuristic response indicates that the transaction participant is unable to honor a transactional prior commitment to the transaction coordinator.

In one embodiment, the message comprises a transaction protocol message. For example, the protocol message may be one which informs the transaction participant that a transaction has been registered with the transaction coordinator. Another example is a prepare message sent as part of a two phase commit protocol.

In one embodiment, the message element comprises a reference parameter within a coordination service's endpoint reference. The coordination service is preferably part of the transaction coordinator and the endpoint reference preferably identifies how the transaction coordination service can be reached.

In one embodiment, the message element comprises part of a body of the transaction protocol message.

In one embodiment, the message element is within a coordination context of an application initiated message, the coordination context comprising an element inserted into the application initiated message by the transaction coordinator. A coordination context preferably provides the information useable by the transaction participant in order to communicate with the transaction coordinator for the purpose of participating in a particular transaction.

According to another aspect, there is provided a method, comprising: providing, via a transaction coordinator, an indication to a transaction participant as part of a message originating from the transaction coordinator, where the message indicates that the transaction coordinator supports a heuristic response and where the message is ignorable by transaction participants that are incapable of communicating a heuristic outcome to the transaction coordinator and where the heuristic response from the transaction participant indicates that the transaction participant is unable to honor a transactional prior commitment to the transaction coordinator.

The invention provides a mechanism for a transaction coordinator to indicate to a transaction participant that it supports a heuristic outcome—i.e. a course of action has occurred which means that the transaction participant is unable to honor a transactional prior commitment to the transaction coordinator. The mechanism is such that a participant that is incapable of communicating a heuristic outcome can ignore any such indication. A participant may be incapable because it does not understand the concept of a heuristic outcome at all or because it does not have the ability to inform a transaction coordinator that one has occurred.

According to one embodiment, providing the indication to the transaction participant as part of the message originating from the transaction coordinator, where the message indicates that the transaction coordinator supports a heuristic response comprises: augmenting the message with a message element originating from the transaction coordinator, where the message element indicates that the transaction coordinator supports the heuristic response.

In one embodiment, the coordinator may augment a protocol message originating from the transaction coordinator. In another embodiment, the message element comprises a coordination context inserted into an application initiated message by the transaction coordinator.

According to another aspect, there is provided an apparatus, comprising: a transaction manager configured to receive, at a transaction participant, a message from a transaction coordinator comprising an indication as to whether the transaction coordinator supports a heuristic response; determine from a message element in the message whether the transaction coordinator supports heuristics, where the message element is ignorable by transaction participants that are incapable of communicating the heuristic response to the transaction coordinator; and responsive to determining that a heuristic outcome has occurred and determining that the transaction coordinator supports heuristics, send the heuristic response to the transaction coordinator, where the heuristic response indicates that the transaction participant is unable to honor a transactional prior commitment to the transaction coordinator.

According to another aspect, there is provided an apparatus, comprising: a transaction manager associated with a transaction coordinator, where the transaction manager is configured to: provide an indication to a transaction participant as part of a message originating from the transaction coordinator, where the message indicates that the transaction coordinator supports a heuristic response and where the message is ignorable by transaction participants that are incapable of communicating a heuristic outcome to the transaction coordinator; and receive the heuristic response from the transaction participant that indicates that the transaction participant is unable to honor a transactional prior commitment to the transaction coordinator.

The invention may be implemented in a computer program product. According to another aspect, there is provided a computer program product for heuristic processing, comprising: a computer readable storage medium having computer readable program code embodied therewith, where the computer readable program code when executed on a computer causes the computer to: receive a message from a transaction coordinator; determine from a message element in the message whether the transaction coordinator supports heuristics, where the message element is ignorable by a transaction participant that is incapable of communicating a heuristic response to the transaction coordinator; and responsive to determining that a heuristic outcome has occurred and determining that the transaction coordinator supports heuristics, send the heuristic response to the transaction coordinator.

BRIEF DESCRIPTION OF THE SEVERAL VIEWS OF THE DRAWINGS

A preferred embodiment of the present invention will now be described, by way of example only, and with reference to the following drawings.

DETAILED DESCRIPTION

Figure 1:
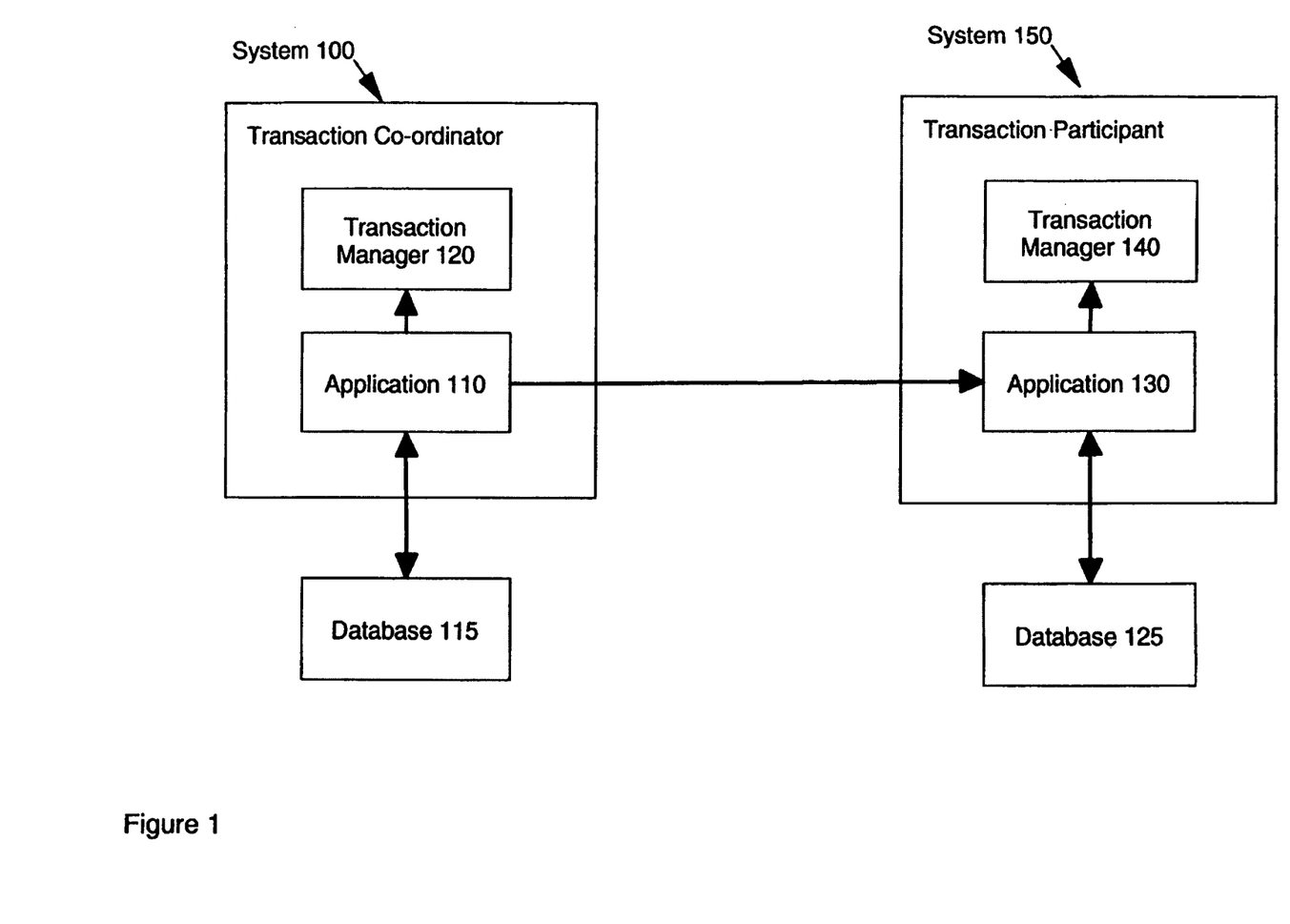
FIG. 1 illustrates a component diagram of an environment in which a preferred embodiment of the present invention can be implemented.

FIG. 1 provides an overview of an environment in which a preferred embodiment of the present invention can be implemented. A system 100 comprises an application 110 which initiates a transaction with application 130 on system 150. The transaction is managed by transaction managers (TMs) 120 and 140, with TM 120 acting as transaction coordinator and TM 140 being a transaction participant. The transaction may involve accessing one or more resources (e.g. databases 115, 125) on the coordinator and participant sides. Such a transaction is performed using the two-phase commit (2PC) protocol.

Figure 2:
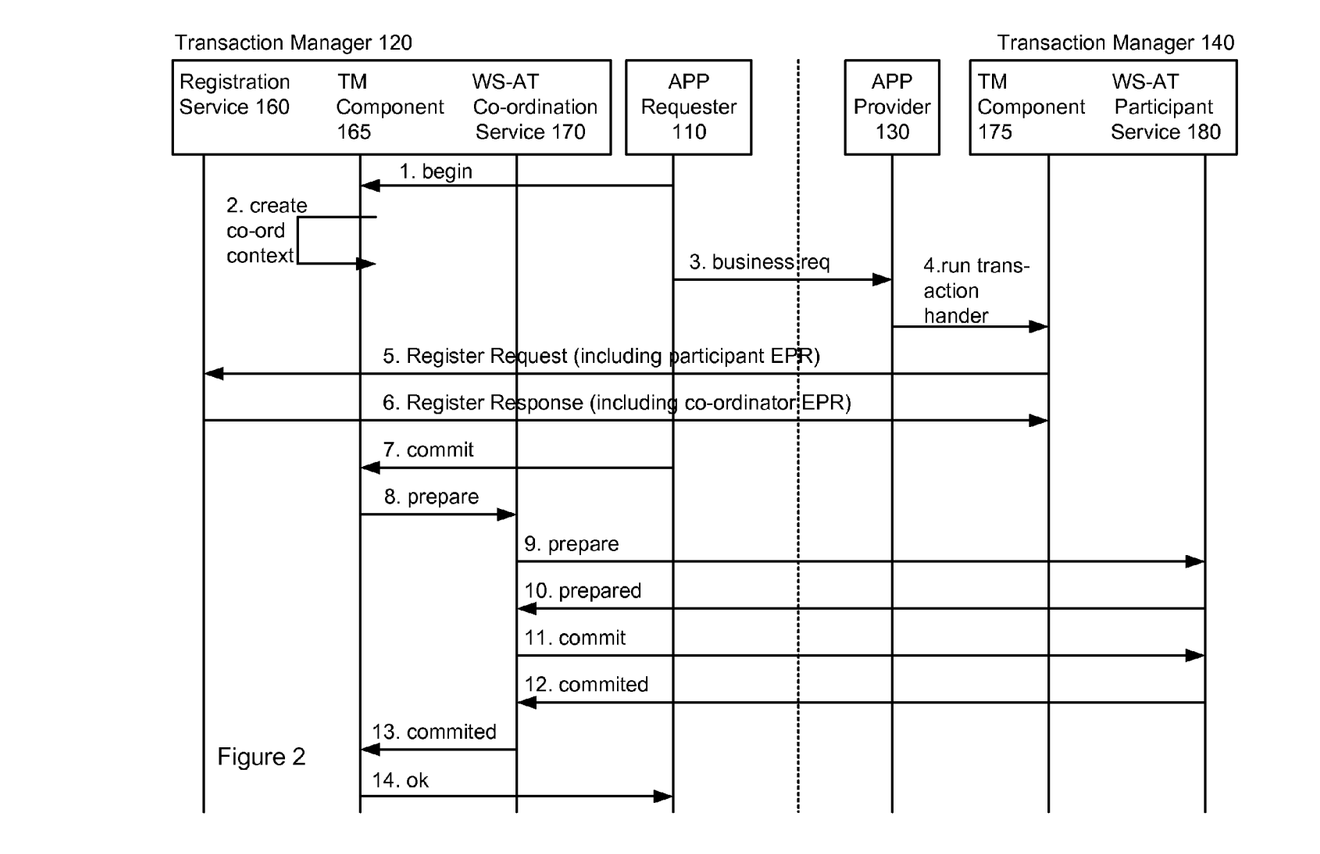
FIG. 2 illustrates example messaging for communication that may take place between systems 100 and 150 of FIG. 1 in accordance with the WS-AT specification.

FIG. 2 illustrates, in more detail, the communication that may take place, between systems 100 and 150, in accordance with the WS-AT specification. The transaction manager 120 comprises, on the requesting side of a registration service 160, a transaction manager component 165 and a WS-AT Co-ordination Service 170. Application 110 is a requesting application. On the provider side, transaction manger 140 comprises a transaction management component 175 and a WS-AT participant service 180. Application 130 is a provider of a service requested by application 110.

At step 1, application requester 110 issues a "begin transaction" request to the transaction manager component 165. This causes transaction manager component 165 to create a co-ordination context for the transaction at step 2. This includes an identifier for the transaction, the endpoint reference (EPR) of the requesting environment's transaction registration service, and information about the transaction regarding security, reliability etc. At step 3, application requester 110 issues a business request, within the context of the initiated transaction (i.e. the generated context is propagated as part of the business request), to application provider 130. The transaction context created in step 2 is propagated in the header of the business request, without changing the payload of the business request.

At step 4, application provider 130 invokes transaction manager component 175. This causes transaction manager component 175 to register itself with transaction manager 120's registration service 160 (step 5). This registration request includes the transaction manager (participant) 140's end-point reference (EPR). An EPR includes the address that is to be used to reach the transaction manager 140 and may also include additional reference parameters that are not required to be understood by the consumer of the EPR; for example, a transaction participant identifier (id).

Receipt of the registration request by the registration service 160 causes the registration service 160 to send a response at step 6 to the transaction manager component 175. The response includes the EPR associated with the coordinating transaction manager 120. At this point the transaction coordinator and participants have exchanged the EPRs that they will address during 2PC protocol messaging.

At step 7, application requester 110 issues a commit request to the transaction manager component 165. This indicates that application requester 110 has completed its work and wishes for the transaction to be completed.

At step 8, the transaction manager component 165 issues a prepare request to the WS-AT Co-ordination service 170 which is then communicated at step 9 to the WS-AT Participant Service 180.

When the WS-AT Participant Service 180 can guarantee that it could commit the work requested, it informs the WS-AT Co-ordination Service 170 that it is "prepared" (step 10).

At step 11, the WS-AT Co-ordination Service 170 issues a commit request to the WS-AT Participant Service 180.

Some time later, when application provider 130 has finished processing the request received from application requester 110, the WS-AT Participant Service 180 informs the WS-AT Co-ordination Service 170 that it has committed the transaction (step 12). This is communicated at step 13 to the transaction manager component 165 which informs the application requester 110 at step 14.

Thus as indicated above, when system 150 can guarantee that it is prepared to do the work requested by system 100, it will inform system 100 that it is "prepared". At this point, system 150 is fully engaged to do the work requested, when system 100 issues a "commit" request. Sometimes, however, circumstances occur which are beyond system 150's immediate control. For example, a network link between system 150 and database 125 may break, meaning that system 150 is unable to actually complete the transaction that it has prepared for. In such a situation, an administrator may make a unilateral decision to rollback the work in the database. Thus when the commit request is received, system 150 is unable to honor this request.

Equally, an administrator may make a decision to commit the database work which the Coordinating Transaction Manager 120 then requests be aborted.

Ideally the system 150 would, in either case, respond to the system 100 with a "heuristic" response. As such, the system 150 may inform the system 100 that it is unable to take the expected course of action; in other words, the system 150 has taken a unilateral course of action, despite its previous guarantee, which is inconsistent with the coordinated outcome.

Figure 3:
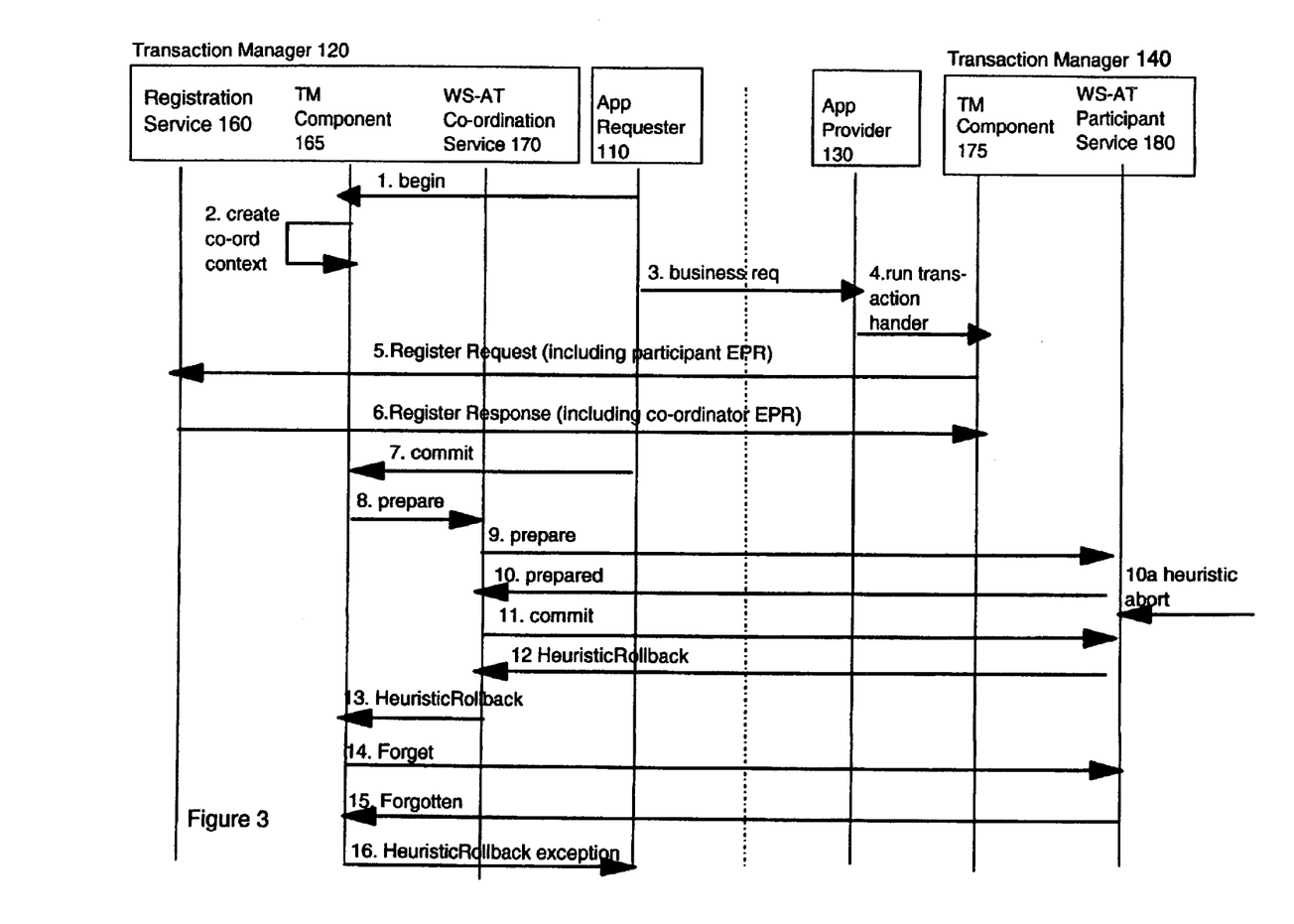
FIG. 3 illustrates, in accordance with a preferred embodiment of the present invention, the communication that takes place between systems 100 and 150 of FIG. 1.

This is illustrated in FIG. 3, where step 10a shows a heuristic action being taken (perhaps as a result of administrative intervention). This causes, at step 12, the WS-AT Participant Service to communicate the heuristic abort to the WS-AT Co-ordination Service. This is then in turn communicated at step 13 to the TM Component 165.

Since protocol messages may be lost in an unreliable network, the participant is required to remember its heuristic decision until told by the Coordinator that it may forget. Steps 14 and 15 show a Forget/Forgotten protocol exchange. Upon sending the Forgotten message, the participant may discard all state related to the transaction. Step 16 shows the final outcome being communicated back to the application requester 110. Step 16 may occur before steps 14 and 15.

As discussed, the communication between the two systems takes place according to the 2PC protocol defined by the WS-AT specification. WS-AT does not, however, define any messages or support for heuristics. An extension to the WS-AT specification is envisaged herein as discussed above with reference to FIG. 3.

Since the provision of heuristic support is an extension to the WS-AT specification, not all transaction coordinators will recognise a heuristic response from a WS-AT Participant Service.

The invention therefore provides, in accordance with a preferred embodiment, a way for a transaction coordinator to indicate to a transaction participant that it supports a heuristic response.

Referring back to FIG. 3, at step 6, the transaction manager 120 augments its coordinator EPR with additional information indicating whether or not it supports heuristics (indication). The receiving transaction manager 140 may then use such information to determine whether or not (should the situation arise) to issue a heuristic response to the transaction manager 120. Augmentation of the EPR at step 6 is one example. Another possible place to augment the EPR is at step 9. Preferably such information is placed as a reference parameter in the EPR provided by the coordinator. Such reference parameters are not required to be understood by the EPR consumer (i.e. the transaction participant) but may be interpreted by an implementation that has been extended to support heuristics. Another possibility is for the indication to be included as a different optional and ignorable extension to a protocol message (e.g. register response or prepare). Yet another option is to include this information as an optional and ignorable part of the coordination context propagated at step 3 of FIG. 2 and FIG. 3.

When services interact via simple object access protocol (SOAP) messages, the EPR addressing information (including reference parameters) may be held within a SOAP header and look generally as follows:

```
<soap: header>
    <wsa: From>
        [address]
        [reference parameters, including that heuristics are
        supported]
    </wsa: From>
    <wsa: To> address </wsa:To>
</soap: header>
```

The particular protocol request being sent may then be contained within the SOAP body of the message.

```
<soap: body>
    <wsat:RegisterResponse>... </wsat:RegisterResponse>
</soap: body>
```

It should be appreciated that it is not essential that the information is communicated as part of the EPR. For example, the transaction coordinator may instead use the optional, ignorable extension element in the wsat:RegisterResponse or wsat:Prepare message to indicate its support for this extension. As such, the "capability" of the coordinator may be communicated in a fashion that may be understood by a consenting participant but does not need to be understood by a generic participant.

HeuristicRollback is illustrated here but the same principles apply to other potential heuristic outcomes, such as HeuristicCommit and HeuristicHazard for example. The latter indicates a transient condition and is returned when the WS-AT participant has temporarily lost connectivity with the back-end resource manager (e.g. database). Subsequent re-sent <wsat:Commit/> or <wsat:Rollback> requests may resolve to the actual outcome for the participant.

Figure 4:
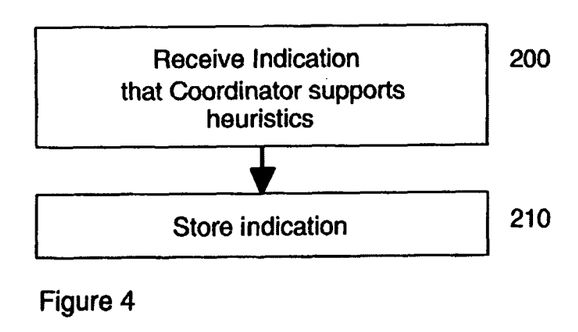
FIGS. 4 and 5 illustrate the processing of the present invention, in accordance with a preferred embodiment.
Figure 5:
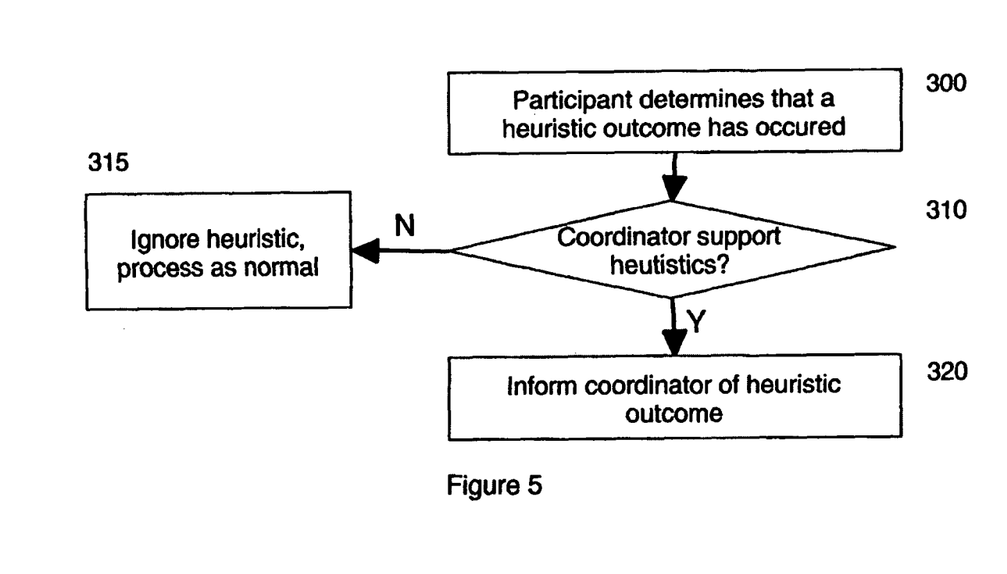

FIGS. 4 and 5 illustrate (in accordance with a preferred embodiment) a way in which a transaction participant makes use of the information provided to it (with respect to heuristics) by a transaction coordinator.

With reference to FIG. 4 first, a transaction participant receives an indication from a transaction coordinator that it supports heuristics (step 200). This information is then stored away at step 210 for later use. Such information may arrive from the coordinator as an EPR reference, may be sent separately, or may be provided in some other way. Such information is transmitted in such a way that it may be ignored by a generic (i.e. unaware) participant. Transmission as an EPR reference parameter is particularly suitable in this respect since an unaware participant may choose to ignore any parameters that it does not require.

As shown in FIG. 5, a heuristic outcome to a transaction between the coordinator and participant may later occur (step 300). If this is so, then it is determined at step 310 (using any indication previously stored as per FIG. 4) whether such an outcome is supported by the transaction coordinator. If it is, then the heuristic outcome is communicated to the coordinator at step 320. If it does not, then processing may continue as if the heuristic outcome did not occur (step 315).

Heuristics outcomes are used if both parties in the transaction have this capability. A coordinator that supports heuristic outcomes must always be prepared to work with a participant that does; similarly, a participant that supports heuristic outcomes may report them to a coordinator that has indicated its support for heuristic outcomes as described above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should be appreciated that whilst the invention is described within the context of WS-AT, this is by way of example only and no limitation is intended.

What is claimed is:

1. A method, comprising:
    receiving, at a transaction participant, a message from a transaction coordinator comprising an indication as to whether the transaction coordinator, that coordinates commitment of transactions as requested by an application, supports a heuristic response from the transaction participant, where heuristic responses are sent by transaction participants to the transaction coordinator that is coordinating the transactions as requested by the application in response to the transaction participants determining that heuristic outcomes occur and the heuristic outcomes comprise situations where the transaction participants determine they are unable to honor transactional prior prepared commitments made to the transaction coordinator during first prepare phases of two-phase commits associated with the transactions, and the transactional prior prepared commitments comprise indications to the transaction coordinator that the transaction participants are prepared during the first prepare phases of the two-phase commits to commit respective portions of the transactions when instructed by the transaction coordinator;
    determining from a message element in the message whether the transaction coordinator supports heuristics, where the message element is ignorable by transaction participants that are incapable of communicating the heuristic response to the transaction coordinator; and
    responsive to the transaction participant determining that a heuristic outcome has occurred based upon an inability to commit a portion of a transaction previously indicated by the transaction participant to the transaction coordinator as prepared to commit and determining that the transaction coordinator supports heuristics, sending the heuristic response from the transaction participant to the transaction coordinator to inform the transaction coordinator that the transaction participant has determined that it is unable to honor a transactional prior prepared commitment made to the transaction coordinator by the transaction participant during a first prepare phase of a two-phase commit associated with a transaction coordinated by the transaction coordinator as requested by the application.

2. The method of claim 1, where the message comprises a transaction protocol message.

3. The method of claim 2, where the message element comprises a reference parameter within a coordination service's endpoint reference.

4. The method of claim 2, where the message element comprises part of a body of the transaction protocol message.

5. The method of claim 1, where the message element is within a coordination context of an application initiated message, the coordination context comprising an element inserted into the application initiated message by the transaction coordinator.

6. A method, comprising:
    providing, via a transaction coordinator, an indication to a transaction participant as part of a message originating from the transaction coordinator, where the message indicates that the transaction coordinator, that coordinates commitment of transactions as requested by an application, supports a heuristic response from the transaction participant that is sent to the transaction coordinator during coordination of the transactions as requested by the application in response to a determination by the transaction participant of a heuristic outcome, where heuristic outcomes comprise situations where transaction participants determine they are unable to honor transactional prior prepared commitments made to the transaction coordinator during first prepare phases of two-phase commits associated with the transactions, and the transactional prior prepared commitments comprise indications to the transaction coordinator that the transaction participants are prepared during the first prepare phases of the two-phase commits to commit respective portions of the transactions when instructed by the transaction coordinator, and where the message is ignorable by transaction participants that are incapable of communicating the heuristic response to the transaction coordinator and where the heuristic response from the transaction participant sent to the transaction coordinator indicates that the transaction participant determined that it is unable to honor a transactional prior prepared commitment made to the transaction coordinator by the transaction participant during a first prepare phase of a two-phase commit associated with a transaction coordinated by the transaction coordinator as requested by the application.

7. The method of claim 6, where providing, via the transaction coordinator, the indication to the transaction participant as part of the message originating from the transaction coordinator, where the message indicates that the transaction coordinator, that coordinates commitment of transactions as requested by the application, supports the heuristic response from the transaction participant that is sent to the transaction coordinator during coordination of the transactions as requested by the application in response to the determination by the transaction participant of the heuristic outcome further comprises:
    augmenting the message with a message element originating from the transaction coordinator, where the message element indicates that the transaction coordinator supports the heuristic response from the transaction participant.

8. The method of claim 7, where the step of augmenting comprises:
    augmenting a protocol message originating from the transaction coordinator.

9. The method of claim 7, where the message element comprises a coordination context inserted into an application initiated message by the transaction coordinator.

10. An apparatus, comprising:
    a communication interface; and
    a processor programmed to execute a transaction manager configured to:

receive, at a transaction participant via the communication interface, a message from a transaction coordinator comprising an indication as to whether the transaction coordinator, that coordinates commitment of transactions as requested by an application, supports a heuristic response from the transaction participant, where heuristic responses are sent by transaction participants to the transaction coordinator that is coordinating the transactions as requested by the application in response to the transaction participants determining that heuristic outcomes occur and the heuristic outcomes comprise situations where the transaction participants determine they are unable to honor transactional prior prepared commitments made to the transaction coordinator during first prepare phases of two-phase commits associated with the transactions, and the transactional prior prepared commitments comprise indications to the transaction coordinator that the transaction participants are prepared during the first prepare phases of the two-phase commits to commit respective portions of the transactions when instructed by the transaction coordinator;

determine from a message element in the message whether the transaction coordinator supports heuristics, where the message element is ignorable by transaction participants that are incapable of communicating the heuristic response to the transaction coordinator; and responsive to the transaction participant determining that a heuristic outcome has occurred based upon an inability to commit a portion of a transaction previously indicated by the transaction participant to the transaction coordinator as prepared to commit and determining that the transaction coordinator supports heuristics, send the heuristic response from the transaction participant to the transaction coordinator to inform the transaction coordinator that the transaction participant has determined that it is unable to honor a transactional prior prepared commitment made to the transaction coordinator by the transaction participant during a first prepare phase of a two-phase commit associated with a transaction coordinated by the transaction coordinator as requested by the application.

11. The apparatus of claim 10, where the message comprises a transaction protocol message.

12. The apparatus of claim 11, where the message element comprises a reference parameter within a coordination service's endpoint reference.

13. The apparatus of claim 11, where the message element comprises part of a body of the transaction protocol message.

14. The apparatus of claim 10, where the message element is within a coordination context of an application initiated message, the coordination context comprising an element inserted into the application initiated message by the transaction coordinator.

15. An apparatus, comprising:
a communication interface; and
a processor programmed to execute a transaction manager associated with a transaction coordinator, where the transaction manager is configured to:
provide an indication to a transaction participant as part of a message originating from the transaction coordinator via the communication interface, where the message indicates that the transaction coordinator, that coordinates commitment of transactions as requested by an application, supports a heuristic response from the transaction participant that is sent to the transaction coordinator during coordination of the transactions as requested by the application in response to a determination by the transaction participant of a heuristic outcome, where heuristic outcomes comprise situations where transaction participants determine they are unable to honor transactional prior prepared commitments made to the transaction coordinator during first prepare phases of two-phase commits associated with the transactions, and the transactional prior prepared commitments comprise indications to the transaction coordinator that the transaction participants are prepared during the first prepare phases of the two-phase commits to commit respective portions of the transactions when instructed by the transaction coordinator, and where the message is ignorable by transaction participants that are incapable of communicating the heuristic outcome to the transaction coordinator; and receive the heuristic response from the transaction participant that indicates that the transaction participant determined that it is unable to honor a transactional prior prepared commitment made to the transaction coordinator by the transaction participant during a first prepare phase of a two-phase commit associated with a transaction coordinated by the transaction coordinator as requested by the application.

16. The apparatus of claim 15, where, in being configured to provide the indication to the transaction participant as part of the message originating from the transaction coordinator via the communication interface, where the message indicates that the transaction coordinator, that coordinates commitment of transactions as requested by the application, supports the heuristic response from the transaction participant that is sent to the transaction coordinator during coordination of the transactions as requested by the application in response to the determination by the transaction participant of the heuristic outcome, the transaction manager is further configured to:
augment the message with a message element originating from the transaction coordinator, where the message element indicates that the transaction coordinator supports the heuristic response from the transaction participant.

17. The apparatus of claim 16, where, in being configured to augment the message with the message element originating from the transaction coordinator, the transaction manager is further configured to:
augment a protocol message originating from the transaction coordinator.

18. The apparatus of claim 16, where the message element comprises a coordination context inserted into an application initiated message by the transaction manager.

19. A computer program product comprising a computer readable storage device having computer readable program code embodied therewith, where the computer readable program code when executed on a computer causes the computer to perform the method of claim 1.

* * * * *